(12) United States Patent
Nakahashi et al.

(10) Patent No.: US 9,370,879 B2
(45) Date of Patent: Jun. 21, 2016

(54) RESIN MOLDING APPARATUS AND RESIN MOLDING METHOD

(75) Inventors: Takahiro Nakahashi, Osaka (JP); Hiroyuki Hanato, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 28 days.

(21) Appl. No.: 14/124,151

(22) PCT Filed: Jun. 7, 2012

(86) PCT No.: PCT/JP2012/064710
§ 371 (c)(1),
(2), (4) Date: Dec. 5, 2013

(87) PCT Pub. No.: WO2012/169597
PCT Pub. Date: Dec. 13, 2012

(65) Prior Publication Data
US 2014/0191429 A1     Jul. 10, 2014

(30) Foreign Application Priority Data
Jun. 8, 2011   (JP) ................. 2011-128559

(51) Int. Cl.
| | |
|---|---|
| *B29C 43/50* | (2006.01) |
| *B29C 37/00* | (2006.01) |
| *B29D 11/00* | (2006.01) |
| *B29C 33/44* | (2006.01) |
| *B29C 43/02* | (2006.01) |
| *B29C 43/56* | (2006.01) |
| *B29C 43/52* | (2006.01) |
| *B29C 43/36* | (2006.01) |
| *B29L 11/00* | (2006.01) |
| *B29C 45/56* | (2006.01) |

(52) U.S. Cl.
CPC ............. *B29C 37/0003* (2013.01); *B29C 33/44* (2013.01); *B29C 43/021* (2013.01); *B29C 43/36* (2013.01); *B29C 43/50* (2013.01); *B29C 43/52* (2013.01); *B29C 43/56* (2013.01); *B29D 11/00009* (2013.01); *B29D 11/00432* (2013.01); *B29C 45/568* (2013.01); *B29C 2043/5092* (2013.01); *B29L 2011/0016* (2013.01)

(58) Field of Classification Search
CPC   B29C 43/021; B29C 43/56; B29D 11/00009; B29D 11/00432; B29L 2011/0016
USPC ....................................... 264/1.36; 425/174.2
See application file for complete search history.

(56) References Cited

U.S. PATENT DOCUMENTS

2011/0074055  A1   3/2011  Nakahashi et al.

FOREIGN PATENT DOCUMENTS

| | | |
|---|---|---|
| JP | 04-361010 | 12/1992 |
| JP | 2011-073300 | 4/2011 |

OTHER PUBLICATIONS

Foreign-language Written Opinion of the International Searching Authority for PCT/JP2012/0564710, mailed Aug. 28, 2012.

*Primary Examiner* — Robert J Grun
(74) *Attorney, Agent, or Firm* — Nixon & Vanderhye P.C.

(57) ABSTRACT

A lens molding apparatus of the present invention includes: a mold having a transfer surface for transferring a predetermined lens shape to a dielectric resin; a mold having a transfer surface for transferring a predetermined lens shape to the dielectric resin; a support device moving the mold; a heating device heating the dielectric resin so as to form a resin molded product, the dielectric resin having been supplied on the transfer surface; a DC power source forming an electric field by application of direct-current voltage between the mold and the mold; and switches switching a direction of the electric field between a direction from the mold to the mold and a direction from the mold to the mold.

3 Claims, 11 Drawing Sheets

US 9,370,879 B2

RESIN MOLDING APPARATUS AND RESIN MOLDING METHOD

This application is the U.S. national phase of International Application No. PCT/JP2012/064710, filed 7 Jun. 2012, which designated the U.S. and claims priority to JP Application No. 2011-128559, filed 8 Jun. 2011; the entire contents of each of which are hereby incorporated by reference.

TECHNICAL FIELD

The present invention relates to a resin molding apparatus and a resin molding method, and in particular, to a lens molding apparatus and a lens molding method each of which makes it possible to easily and highly accurately mold a lens having a complex shape.

BACKGROUND ART

A conventionally employed lens molding method for molding a lens includes pressing, against a resin material, a mold having a transfer surface for transferring a lens shape and curing the resin material in a state where the mold is pressed against this resin material. In this lens molding method, a molded lens is released from the mold after the resin material is cured. However, when the molded lens is released from the mold, the molded lens may be damaged due to adhesion between the lens and the transfer surface.

In order to solve the above problem, Patent Literature 1 discloses a technique for releasing a molded lens from a mold in a compound lens molding apparatus. According to this technique, as illustrated in FIG. 11, the molded lens is released from a mold 400, by applying a high-frequency voltage to the mold 400 and vibrating a molding surface 401 of the mold 400. In this method, the molding surface 401 undergoes elastic deformation and thereby an adhesion strength between the lens and the molding surface 401 can be decreased. Therefore, the molded lens may be safely released from the mold by the method.

CITATION LIST

Patent Literature

Patent Literature 1

Japanese Patent Application Publication, Tokukaihei, No. 4-361010 A (Publication Date: Dec. 14, 1992)

SUMMARY OF INVENTION

Technical Problem

As optical systems are improved so as to have a higher performance, a technique for accurately processing a thin-wall lens having a complex shape becomes important. In particular, a thin-wall lens having a largely varying thickness and a large aspherical surface cannot ensure a sufficient rigidity. As a result, the lens itself may be damaged, for example, deformed or cracked, due to a load that is applied on the lens adhered to a mold at the time when the lens is peeled off from the mold. Accordingly, it is required in molding an aspherical lens or the like, to reduce a resistance between a molded product and a mold as much as possible. Further, in such molding, there is a problem in that mold release is difficult.

In a case where the method described in Patent Literature 1 is applied to an aspherical lens or the like, a mold is released by vibrating a molding surface of the mold. This vibration may damage, for example, deform or crack a lens.

The present invention is attained in view of the above problems. An object of the present invention is to provide a resin molding apparatus and a resin molding method each of which makes it possible to easily and highly accurately mold a resin molded product.

Solution to Problem

In order to solve the above problems, a resin molding apparatus of the present invention includes: a first mold having a first transfer surface for transferring a predetermined shape to a dielectric resin material; a second mold having a second transfer surface for transferring a predetermined shape to the dielectric resin material, the second transfer surface being opposed to the first transfer surface; moving means that shifts a relative position of the first mold and the second mold; curing means that cures the dielectric resin material so as to form a resin molded product while the second transfer surface is being pressed against the dielectric resin material, the dielectric resin material having been supplied on the first transfer surface; electric field forming means that forms an electric field by application of direct-current voltage between the first mold and the second mold; and switching means that switches a direction of the electric field between a direction from the first mold to the second mold and a direction from the second mold to the first mold.

According to the above arrangement, in a state where the second transfer surface of the second mold is pressed against a resin material supplied on the first transfer surface of the first mold, the curing means cures the resin material so that a resin molded product is formed. In this arrangement, while the resin material is being cured, the electric field forming means forms an electric field between the first mold and the second mold. Then, after the resin material is solidified, a direction of the electric field is switched to an opposite direction by the switching means and the second transfer surface is separated from the resin molded product by the moving means. In other words, in a case where the direction of the electric field formed during curing of the resin material is the direction from the first mold to the second mold, the switching means switches the direction of the electric field to the direction from the second mold to the first mold after the resin material is solidified. Similarly, in a case where the direction of the electric field formed during curing of the resin material is the direction from the second mold to the first mold, the switching means switches the direction of the electric field to the direction from the first mold to the second mold after the resin material is solidified.

When the resin material is solidified, a charged state of the resin material is fixed. Therefore, when the direction of the electric field is reversed after solidification of the resin material, the first and second molds and the resin material repel each other. Therefore, adhesion between the first and the second mold and the resin material decreases. This makes it possible to separate the mold without putting a load on the resin material. Therefore, it becomes possible to provide a resin molding apparatus capable of easily and highly precisely molding a resin molded product.

In order to solve the above problems, a resin molding method of the present invention includes the steps of: (a) curing a dielectric resin material so as to form a resin molded product while a second transfer surface of a second mold is being pressed against the dielectric resin material, the dielectric resin material having been supplied on a first transfer surface of a first mold; and (b) separating the second transfer surface from the resin molded product, the step (a) including the sub-step of forming an electric field in a predetermined direction by application of direct-current voltage between the first mold and the second mold, the step (b) including the sub-step of forming an electric field in a direction that is opposite to the predetermined direction between the first mold and the second mold.

According to the above arrangement, in the step (a) of curing a resin material, in a state where the second transfer surface of the second mold is pressed against the resin material supplied on the first transfer surface of the first mold, the resin material is cured. Further, in the step (b) of releasing a mold, the second transfer surface is separated from a resin molded product. In this way, the resin molded product is molded. In this arrangement, in the step (a) of curing the resin material, an electric field in a predetermined direction is formed between the first mold and the second mold, and in the step (b) of releasing a mold, an electric field in a direction opposite to the predetermined direction is formed.

When the resin material is solidified, a charged state of the resin material is fixed. Therefore, when the direction of the electric field is reversed after solidification of the resin material, the first and second molds and the resin material repel each other. Therefore, adhesion between the first and the second mold and the resin material decreases. This makes it possible to separate the mold without putting a load on the resin material. Therefore, it becomes possible to provide a resin molding method that makes it possible to easily and highly precisely mold a resin molded product.

Advantageous Effects of Invention

As described above, a resin molding apparatus of the present invention includes: a first mold having a first transfer surface for transferring a predetermined shape to a dielectric resin material; a second mold having a second transfer surface for transferring a predetermined shape to the dielectric resin material, the second transfer surface being opposed to the first transfer surface; moving means that shifts a relative position of the first mold and the second mold; curing means that cures the dielectric resin material so as to form a resin molded product while the second transfer surface is being pressed against the dielectric resin material, the dielectric resin material having been supplied on the first transfer surface; electric field forming means that forms an electric field by application of direct-current voltage between the first mold and the second mold; and switching means that switches a direction of the electric field between a direction from the first mold to the second mold and a direction from the second mold to the first mold. Further, a resin molding method of the present invention includes the steps of: (a) curing a dielectric resin material so as to form a resin molded product while a second transfer surface of a second mold is being pressed against the dielectric resin material, the dielectric resin material having been supplied on a first transfer surface of a first mold; and (b) separating the second transfer surface from the resin molded product, the step (a) including the sub-step of forming an electric field in a predetermined direction by application of direct-current voltage between the first mold and the second mold, the step (b) including the sub-step of forming an electric field in a direction that is opposite to the predetermined direction between the first mold and the second mold.

Therefore, the present invention can provide a resin molding apparatus and a resin molding method each of which makes it possible to easily and highly accurately mold a resin molded product.

DESCRIPTION OF EMBODIMENTS

The following discusses one embodiment of the present invention, with reference to FIGS. 1 through 10.

(Arrangement of Lens Molding Apparatus)

Figure 1:
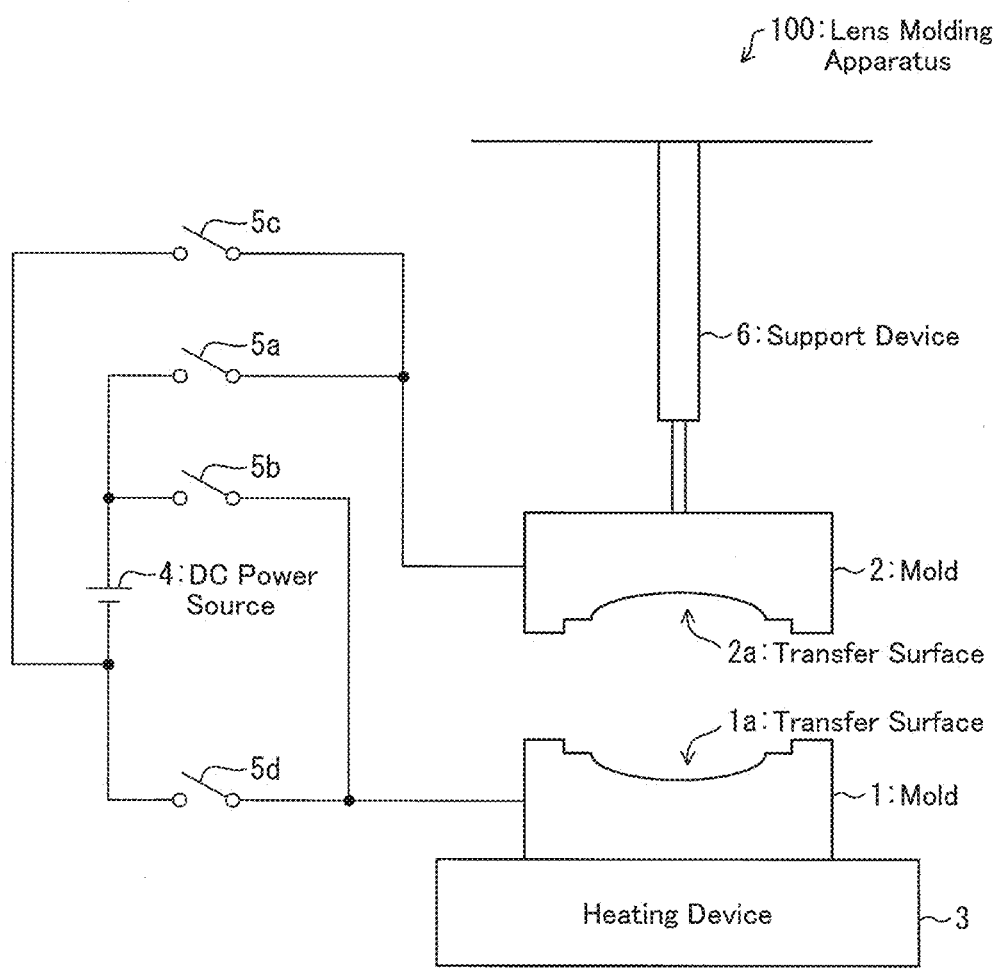
FIG. 1 is a view illustrating an arrangement of a lens molding apparatus according to an embodiment of the present invention.

FIG. 1 is a view illustrating an arrangement of a lens molding apparatus (resin molding apparatus) 100 according to the present embodiment. The lens molding apparatus 100 is an apparatus for molding a lens from a dielectric resin, and includes a mold 1, a mold 2, a heating device 3, a DC (direct-current) power source 4, four switches 5a, 5b, 5c and 5d, and a support device 6.

The mold 1 corresponds to a first mold in the claims and is provided on the heating device 3. The mold 2 corresponds to a second mold in the claims and is supported by the support device 6 above the mold 1. The support device 6 is an extendable member and is capable of moving the mold 2 up and down in FIG. 1. Note that the support device 6 corresponds to moving means in the claims.

The mold 1 has a transfer surface 1a for transferring a predetermined lens shape to a dielectric resin. At the center of the transfer surface 1a, an aspherical depression is formed. Similarly, the mold 2 has a transfer surface 2a for transferring a predetermined lens shape to the dielectric resin. At the center of this transfer surface 2a, an aspherical depression is formed. The transfer surface 1a and the transfer surface 2a are opposed to each other. Further, the molds 1 and 2 each function as an electrode for forming an electric field.

The heating device 3 corresponds to curing means in the claims and cures, by heating the mold 1, the dielectric resin supplied onto the transfer surface 1a of the mold 1. The start/end of this heating may be controlled by a sequence program or the like, or alternatively controlled manually.

The DC power source 4 corresponds to electric field forming means in the claims. The DC power source 4 is for example, a 6 kV DC power source and is connected to the molds 1 and 2 via the switches 5a, 5b, 5c and 5d. More specifically, a positive electrode of the DC power source 4 is connected to the mold 2 via the switch 5a and also to the mold 1 via the switch 5b. Moreover, a negative electrode of the DC power source 4 is connected to the mold 2 via the switch 5c and also to the mold 1 via the switch 5d. By performing ON/OFF control of each of the switches 5a, 5b, 5c and 5d, an electric field can be produced between the molds 1 and 2. Note that the switches 5a, 5b, 5c and 5d correspond to switching means in the claims.

(Step of Molding Lens)

Next, the following discusses the step of molding a lens in the lens molding apparatus 100, with reference to FIGS. 2 through 5.

Figure 2:
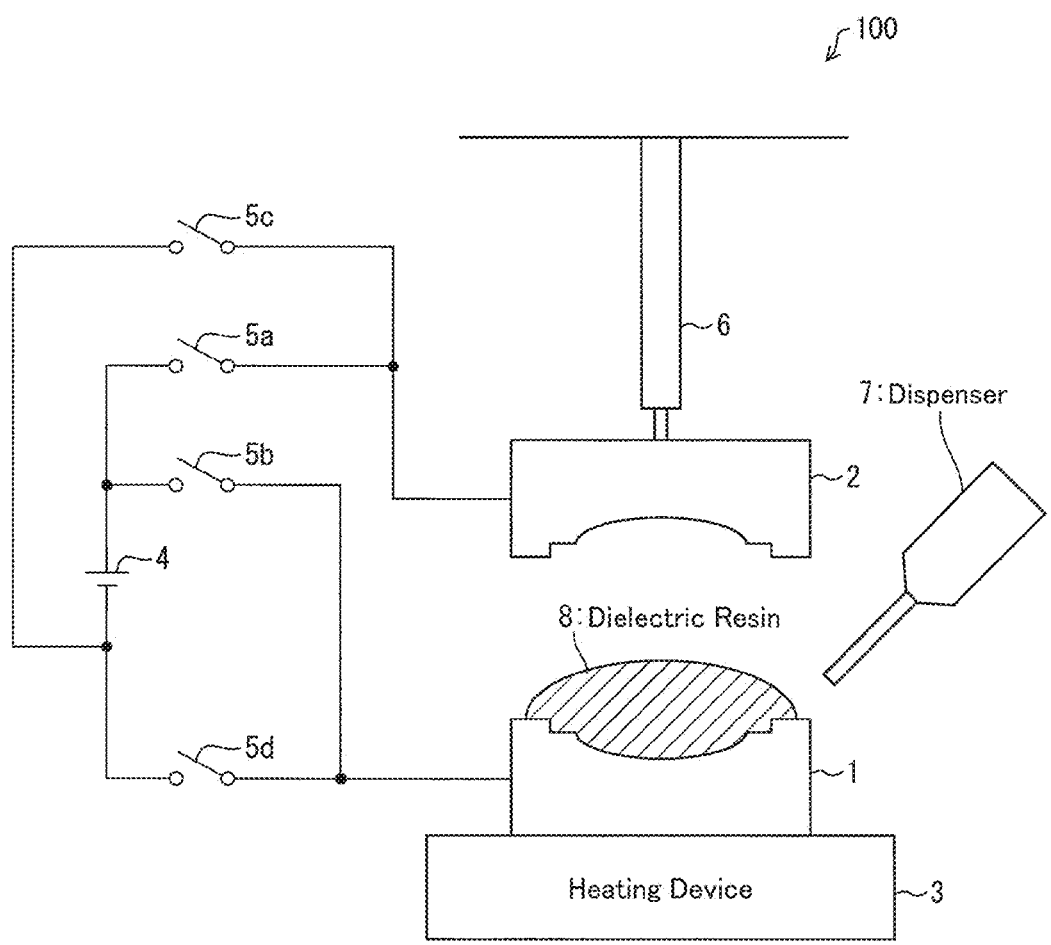
FIG. 2 is a view illustrating a state in which a dielectric resin is supplied onto a transfer surface of a mold in the lens molding apparatus as illustrated in FIG. 1.

First, as illustrated in FIG. 2, a dielectric resin 8 is supplied on the transfer surface 1a of the mold 1 with use of a dispenser 7. The dielectric resin 8 is a thermosetting resin that is cured by heating. Note that at this time, all of the four switches 5a, 5b, 5c and 5d are in an OFF state.

Figure 3:
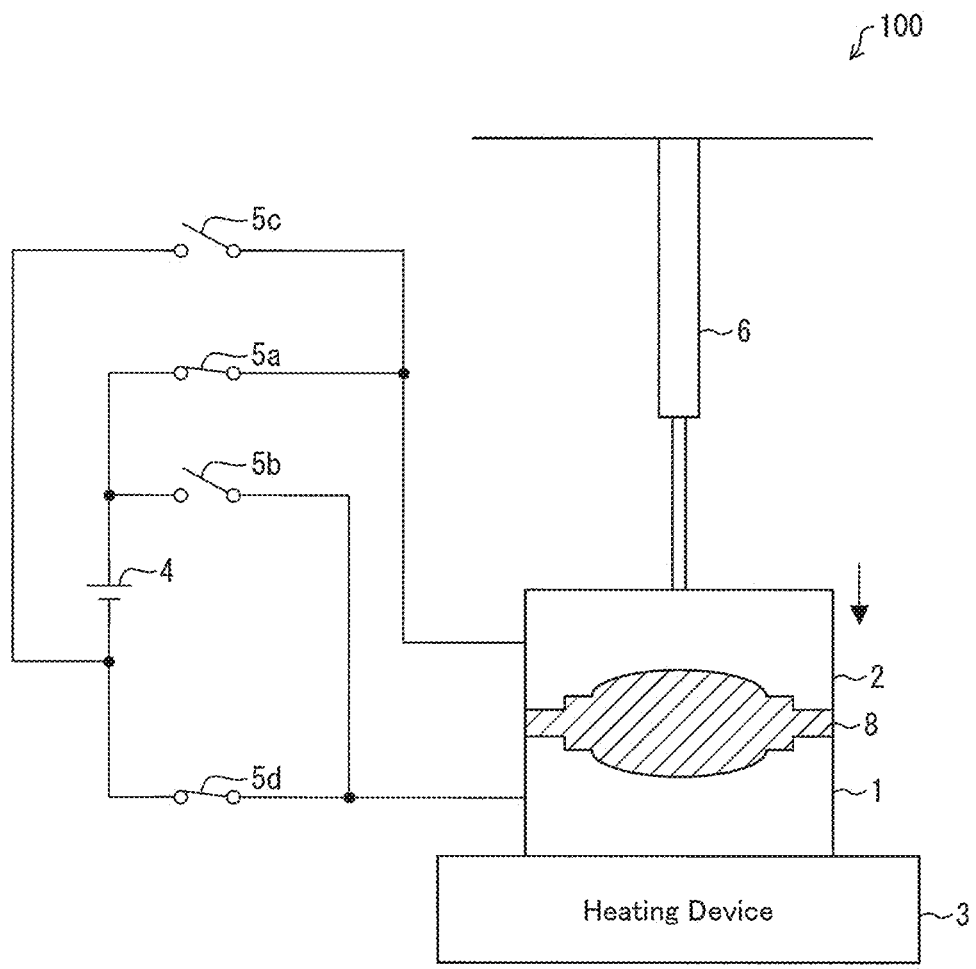
FIG. 3 is a view illustrating a state in which the dielectric resin is being heated while a transfer surface of another mold is pressed against the dielectric resin.

Next, as illustrated in FIG. 3, the support device 6 moves the mold 2 downward and presses the transfer surface 2a of the mold 2 against the dielectric resin 8. At this time, the switches 5a and 5d are turned ON so as to make a potential of the mold 2 higher than a potential of the mold 1. As a result, an electric field in a direction from the mold 2 to mold 1 is produced between the molds 1 and 2. Therefore, the dielectric resin 8 is attracted to the transfer surface 2a of the mold 2. Therefore, air bubbles are hardly produced between the transfer surface 2a and the dielectric resin 8. This makes it possible to highly accurately transfer a shape of the transfer surface 2a to the dielectric resin 8.

Further, the mold 1 is heated by the heating device 3 in a state where the transfer surface 2a of the mold 2 is pressed against the dielectric resin 8 and the electric field in the direction from the mold 2 to mold 1 is formed (the step of curing a resin material). Thereby, the dielectric resin 8 is cured.

Figure 4:
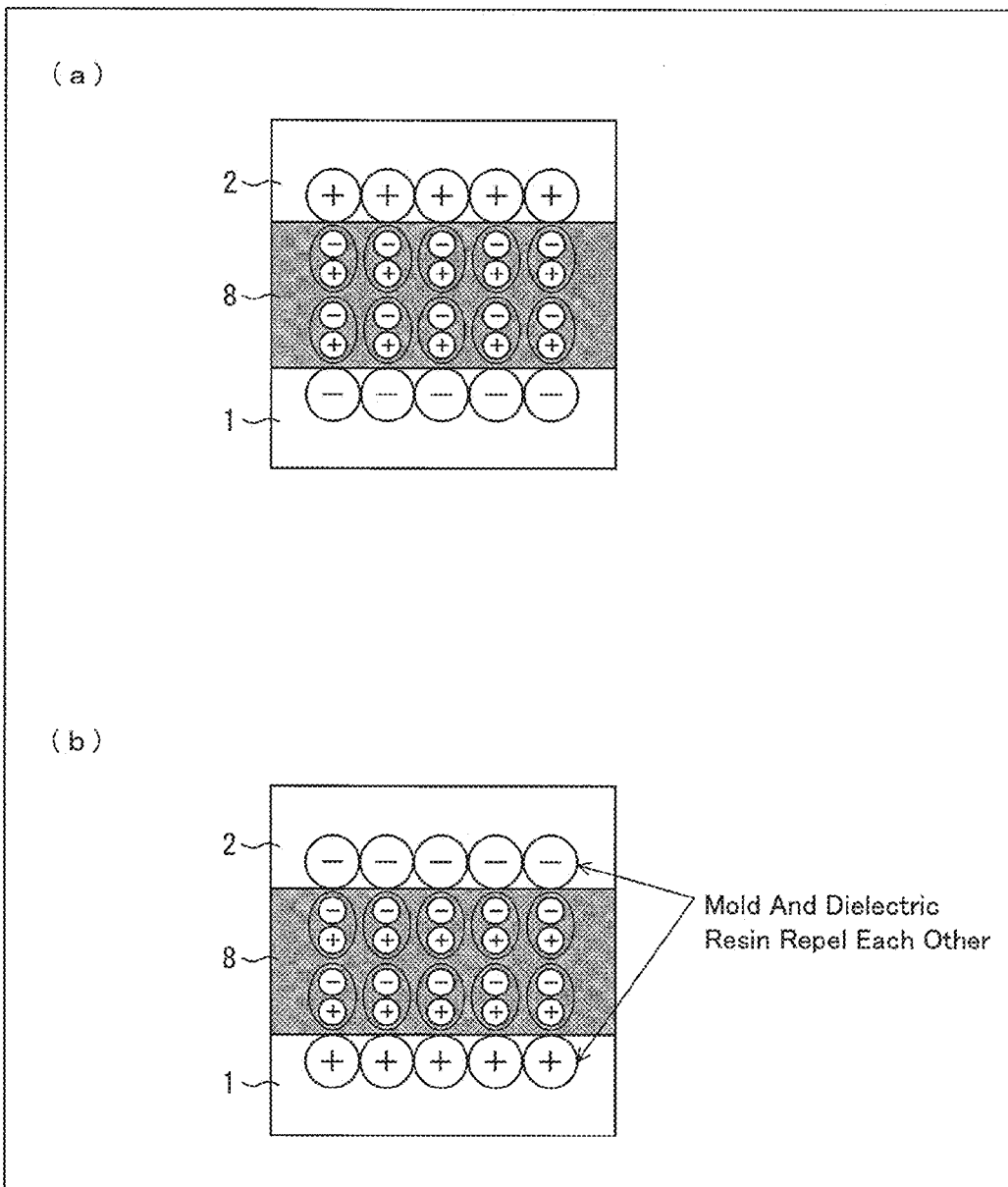
FIG. 4 is a view illustrating a charged state of the molds and the dielectric resin. (a) of FIG. 4 illustrates a state prior to curing of the dielectric resin; and (b) of FIG. 4 illustrates a state after curing of the dielectric resin.

At this time, the molds 1 and 2 and the dielectric resin 8 are in a charged state as illustrated in (a) of FIG. 4. Because the potential of the mold 2 is higher than the potential of the mold 1, a surface of the dielectric resin 8 in contact with the mold 2 is negatively charged, while a surface of the dielectric resin 8 in contact with the mold 1 is positively charged.

Figure 5:
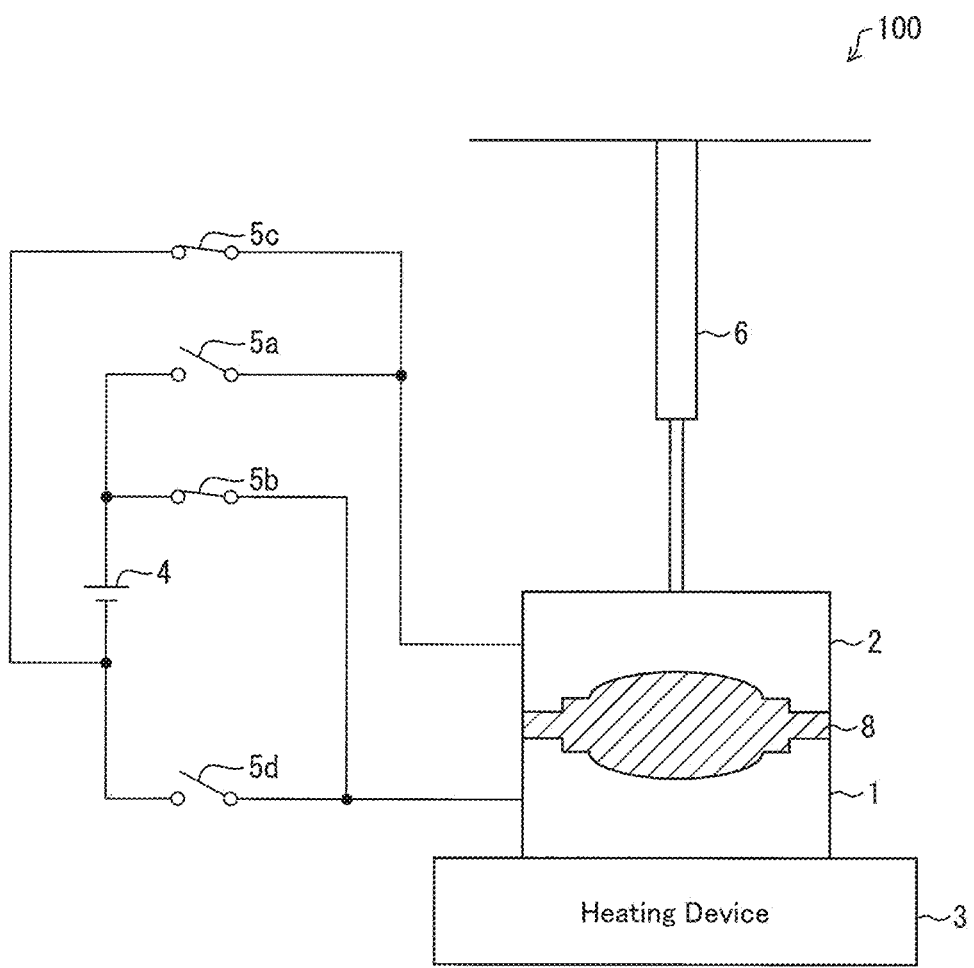
FIG. 5 is a view illustrating a state where an electric field is reversed after the dielectric resin is solidified.

After the dielectric resin 8 is solidified, heating is stopped. Then, as illustrated in FIG. 5, the switches 5a and 5d are turned OFF while the switches 5b and 5c are turned ON. This causes the potential of the mold 1 to become higher than the potential of the mold 2. As a result, the direction of the electric field between the molds 1 and 2 is reversed.

At this time, the molds 1 and 2 and the dielectric resin 8 are in a charged state as illustrated in (b) of FIG. 4. Because the dielectric resin 8 has been solidified, the charged state of the dielectric resin 8 is identical to the state during curing as illustrated in (a) of FIG. 4. On the other hand, because the mold 1 is positively charged while the mold 2 is negatively charged, the molds 1 and 2 and the dielectric resin 8 repel each other. This makes it possible to significantly decrease adhesion between the dielectric resin 8 and the molds 1 and 2 as compared to a case where the electric field is not formed.

Figure 6:
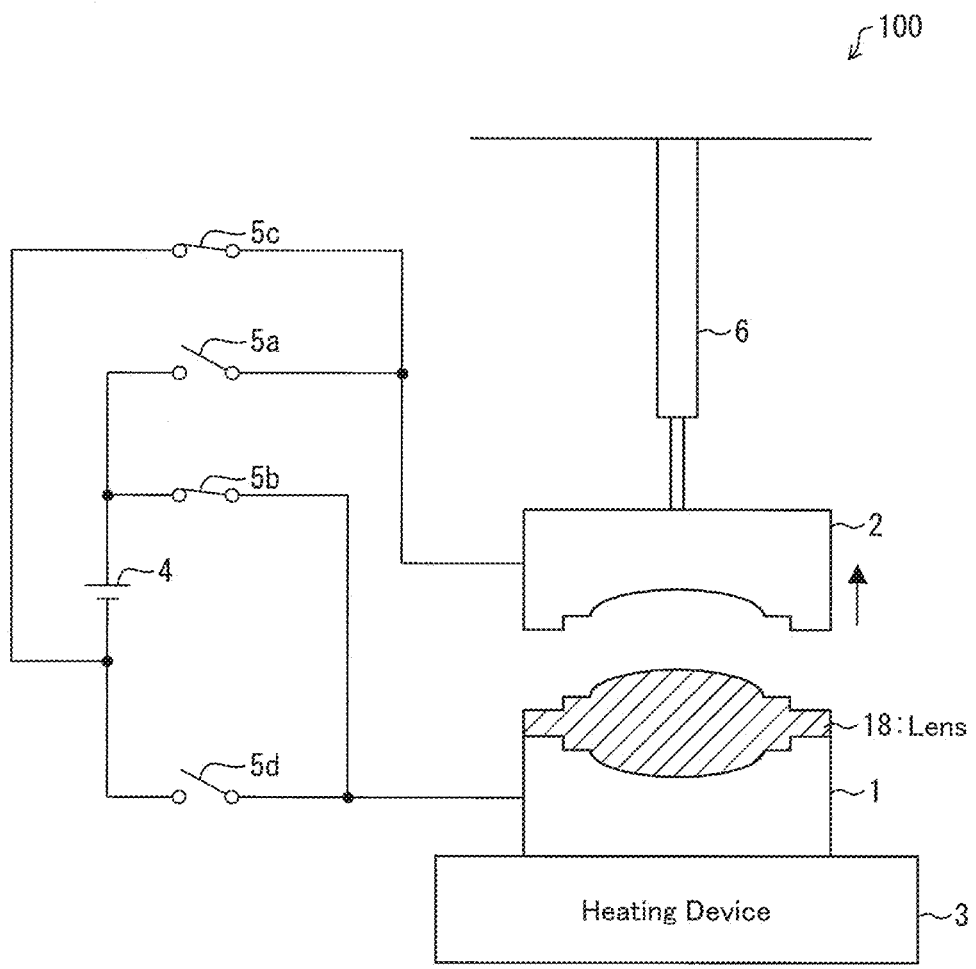
FIG. 6 is a view illustrating a state where the transfer surface of the another mold is separated from the dielectric resin.

In the above state, as illustrated in FIG. 6, the support device 6 moves the mold 2 upward so as to separate the transfer surface 2a from the dielectric resin 8 (the step of releasing/separating a mold). As a result, a lens 18 having an aspherical shape is formed. Because the adhesion between the mold 2 and the dielectric resin 8 is decreased as described above due to formation of the electric field, the mold 2 can be released without putting a load on the dielectric resin 8. Further, unlike a conventional arrangement, it is not necessary to apply vibration for the purpose of reducing adhesion between a mold and a resin molded product, it is possible to mold a lens 18 that has not been damaged.

As described above, the lens molding apparatus 100 of the present embodiment can easily and highly accurately mold a lens having a complex shape. Further, this lens molding apparatus 100 also can easily mold a lens having a largely varying thickness and a large aspherical surface while widening a range of a dielectric resin for the lens.

In the above arrangement, the electric field in the direction from the mold 2 to the mold 1 is formed before the dielectric resin 8 is solidified and then, after the dielectric resin 8 is solidified, the direction of the electric field is switched to the direction from the mold 1 to mold 2. However, the present invention is not limited to this arrangement. The present invention may alternatively be arranged such that the electric field in the direction from the mold 1 to the mold 2 is formed before the dielectric resin 8 is solidified and then, after the dielectric resin 8 is solidified, the direction of the electric field is switched to the direction from the mold 2 to mold 1.

Further, in the above arrangement, a thermosetting resin is employed as the dielectric resin 8. However, the present invention is not limited to the above arrangement. For example, it is possible to use photocurable resin that is cured by UV irradiation. In this case, a UV irradiation device is used in place of the heating device 3.

Further, in the above arrangement, the direction of the electric filed is switched by ON/OFF control of the switches 5a to 5d. However, the present invention is not limited to this arrangement. For example, the present invention may alternatively be arranged such that the direction of the electric field is switched by (i) first providing a DC power source whose positive electrode is connected to the mold 1 and whose negative electrode is connected to the mold 2 and another DC power source whose negative electrode is connected to the mold 1 and whose positive electrode is connected to the mold 2 and (ii) then changing respective connections between the direct current power sources and the molds.

Figure 7:
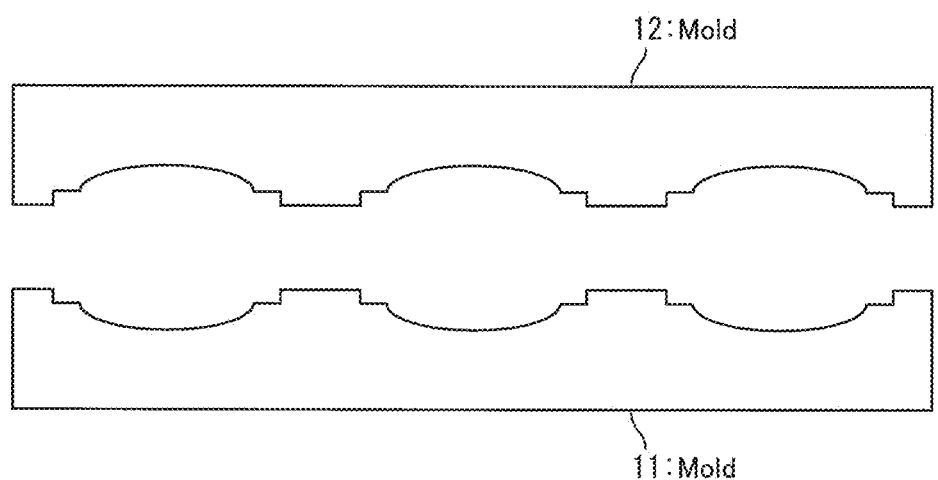
FIG. 7 is a modified example of the molds.

Further, the molds 1 and 2 each employed for lens molding are molds for forming one lens in the above arrangement, but for example, molds for molding a plurality of lens provided in an array, such as molds 11 and 12 as illustrated in FIG. 7, may be used.

(Timings for Electric Field Formation and Electric Field Reversal)

Next, the following discusses one example of respective timings for electric field formation and electric field reversal between the molds 1 and 2.

Figure 8:
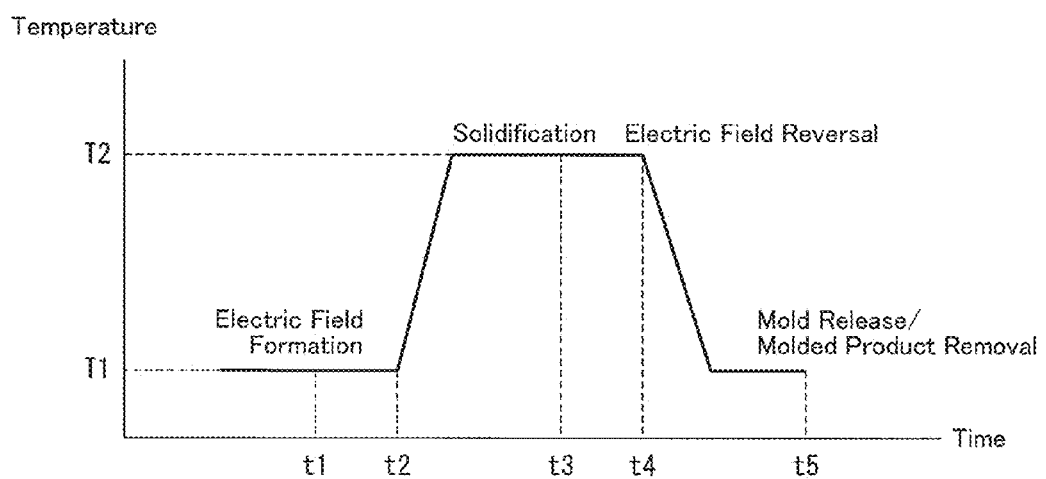
FIG. 8 is a graph showing temperatures of the dielectric resin in time series.

FIG. 8 is a graph showing temperatures of the dielectric resin 8 in time series. At a time point (see FIG. 2) when the dielectric resin 8 is supplied to the mold 1, a temperature of the dielectric resin 8 is T1. At the time t1, the electric field in the direction from the mold 2 to the mold 1 is formed (see FIG. 3). Then, at the time t2, heating is started and the temperature of the dielectric resin 8 rises to T2. Subsequently, at the time t3, the dielectric resin 8 is solidified.

Then, at the time t4, the direction of the electric field is reversed into the direction from the mold 1 to the mold 2 at the same time as the start of cooling (see FIG. 5). As a result, force for separating the dielectric resin 8 and the molds 1 and 2 works and consequently, adhesion between the dielectric resin 8 and the molds 1 and 2 decreases. After the end of cooling, at the time t5, the mold 2 is moved upward and the lens 18 thus molded is taken out (FIG. 6).

The respective timings for electric field formation and electric field reversal are not limited to the above timings. The timing for electric field formation may be at any time before the time t3 at which the dielectric resin is solidified. Further, the timing for electric field reversal may be at any time after the dielectric resin 8 is solidified and before the mold is released.

Modified Example 1

Next, the following discusses modified examples of the present embodiment. Note that for convenience of the explanation, each member having an identical function to a member discussed above is given the same reference sign and an explanation thereof is omitted.

Figure 9:
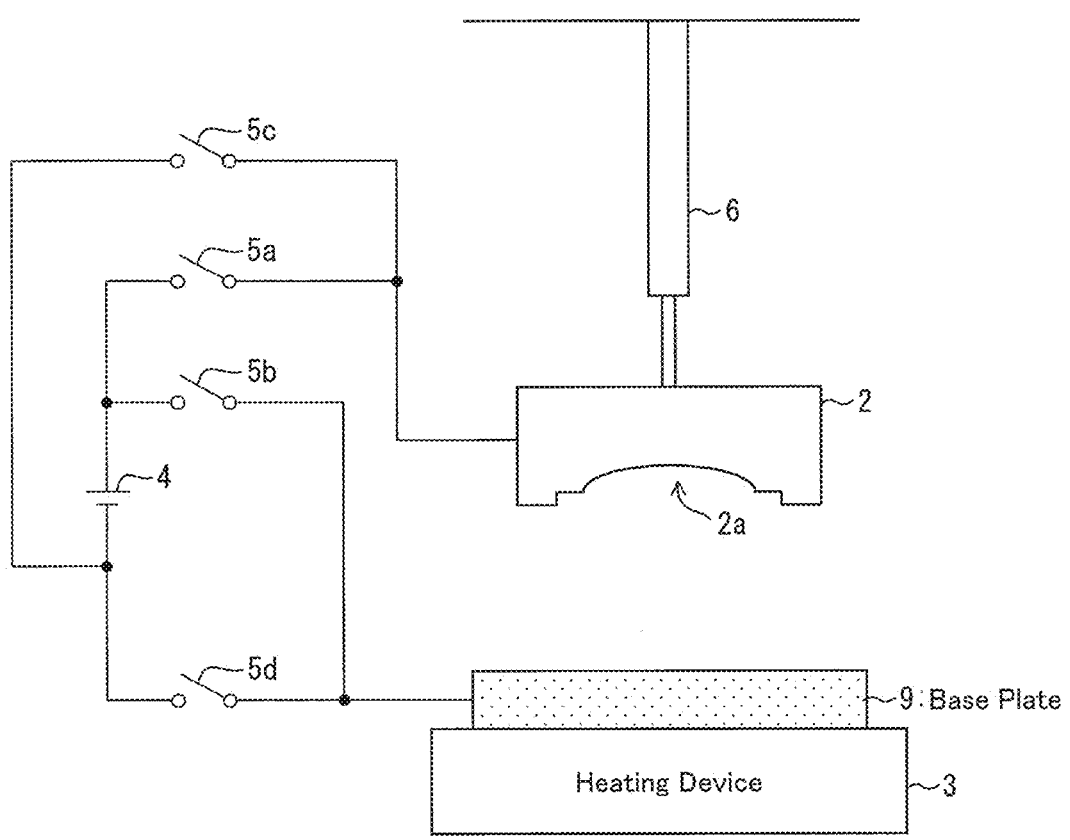
FIG. 9 is a view illustrating an arrangement of a lens molding apparatus according to Modified Example 1 of the embodiment of the present invention.

FIG. 9 is a view illustrating an arrangement of a lens molding apparatus 200 according to Modified Example 1 of the present embodiment. The lens molding apparatus 200 is arranged by replacing the mold 1 in the lens molding apparatus 100 as illustrated in FIG. 1 to a base plate 9. The base plate 9 is connected to a positive electrode of a DC power source 4 via a switch 5b and also to a negative electrode of a DC power source 4 via a switch 5d.

The step of molding a lens in the lens molding apparatus 200 is substantially the same as that in the lens molding apparatus 100. That is, a dielectric resin is supplied on the base plate 9. Then, while a transfer surface 2a of a mold 2 is being pressed against the dielectric resin, an electric field is formed between the mold 2 and the base plate 9. In this state, the dielectric resin is cured. After the dielectric resin is solidified, a direction of the electric field is reversed and the mold is released. This makes it possible to easily and highly accurately mold a single-sided lens having a complex shape.

Note that the mold 2 in Modified Example 1 corresponds to a mold in the claims.

Modified Example 2

In the above arrangement, the electric field is formed by applying direct-current voltage between the molds 1 and 2 or between the mold 2 and the base plate 9. However, the present invention may alternatively be arranged such that alternate-current voltage is applied in place of the direct-current voltage.

Figure 10:
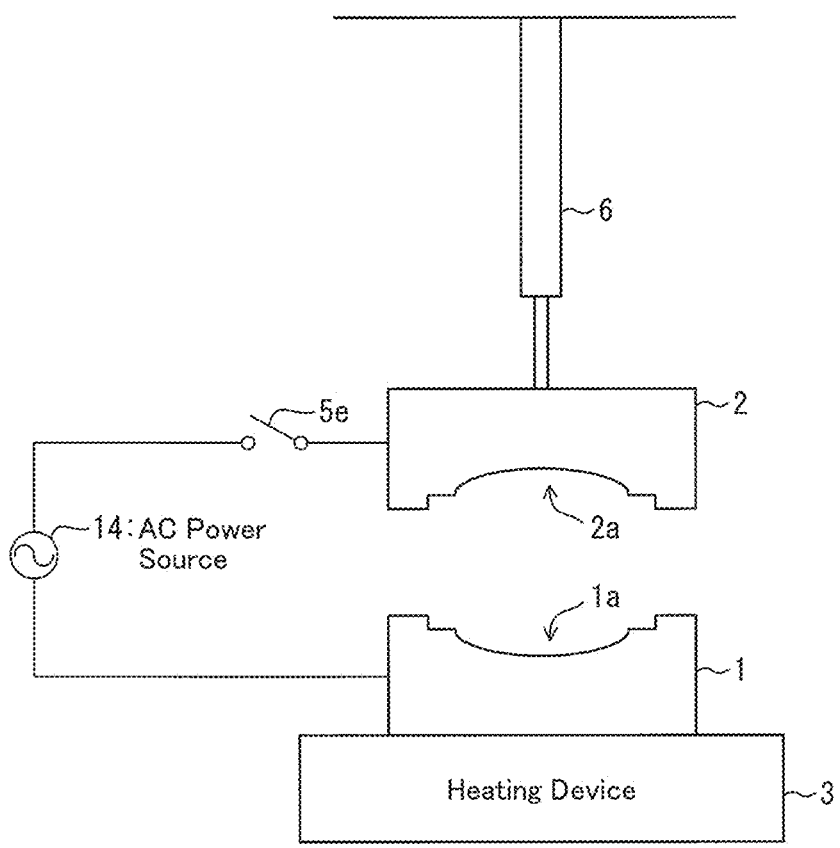
FIG. 10 is a view illustrating an arrangement of a lens molding apparatus according to Modified Example 2 of the embodiment of the present invention.
Figure 11:
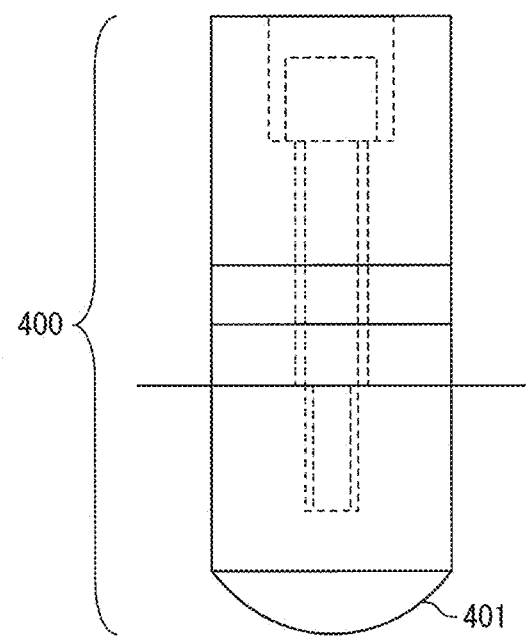
FIG. 11 is a view illustrating a mold of a conventional lens molding apparatus.

FIG. 10 is a view illustrating an arrangement of a lens molding apparatus 300 according to Modified Example 2 of the embodiment of the present invention. The lens molding apparatus 300 has an arrangement in which the DC power source 4 in the lens molding apparatus 100 illustrated in FIG. 1 is replaced by an AC (alternate-current) power source 14. One electrode of the AC power source 14 is connected to a mold 2 via a switch 5e while the other electrode of the AC power source 14 is directly connected to a mold 1.

In the step of molding a lens in the lens molding apparatus 300, after a dielectric resin is supplied onto a transfer surface 1a of the mold 1, the switch 5e is turned ON. Thereby, alternate-current voltage is applied between the molds 1 and 2. In such a state, a transfer surface 2a of the mold 2 is pressed against the dielectric resin and the dielectric resin is heated. The above application of the alternate-current voltage is continued, until the dielectric resin is solidified and the mold is released.

The dielectric resin is attracted to the transfer surface 2a of the mold 2 by application of the alternate-current voltage, until the dielectric resin is solidified. Meanwhile, after the dielectric resin is solidified, polarities of the molds 1 and 2 are constantly reversed and thereby, dipoles on a surface of the dielectric resin move following reversal of an electric field between the molds 1 and 2. This movement of the dipoles decreases adhesion between the dielectric resin and the molds 1 and 2. This makes it possible to easily release the mold.

Note that the alternate-current voltage may be applied only at the time when the mold is released. Further, the present invention may be arranged such that the direct-current voltage is applied between the molds 1 and 2 until the dielectric resin is solidified and then, when the mold is released, the alternate-current voltage is applied between the molds 1 and 2.

(Additional Matters)

The present invention is not limited to the description of the embodiment above, but may be altered by a skilled person within the scope of the claims. An embodiment based on a proper combination of technical means modified as appropriate within the scope of the claims is encompassed in the technical scope of the present invention.

A resin molding apparatus of the embodiment of the present invention includes: a base plate; a mold having a transfer surface for transferring a predetermined shape to a dielectric resin material; moving means that shifts a relative position of the mold and the base plate; curing means that cures the dielectric resin material so as to form a resin molded product while the transfer surface is being pressed against the dielectric resin material, the dielectric resin material having been supplied on the base plate; electric field forming means that forms an electric field by application of direct-current voltage between the mold and the base plate; and switching means that switches a direction of the electric field between a direction from the mold to the base plate and a direction from the base plate to the mold.

According to the above arrangement, in a state where the transfer surface of the mold is pressed against a resin material supplied on the base plate, the curing means cures the resin material so that a resin molded product is formed. In this arrangement, while the resin material is being cured, the electric field forming means forms an electric field between the base plate and the mold. Then, after the resin material is solidified, a direction of the electric field is switched to an opposite direction by the switching means and the transfer surface is separated from the resin molded product by the moving means. In other words, in a case where the direction of the electric field formed during curing of the resin material is a direction from the base plate to the mold, the switching means switches the direction of the electric field to the direction from the mold to the base plate after the resin material is solidified. Similarly, when the direction of the electric field formed during curing of the resin material is the direction from the mold to the base plate, the switching means switches the direction of the electric field from the base plate to the mold after the resin material is solidified.

When the resin material is solidified, a charged state of the resin material is fixed. Therefore, when the direction of the electric field is reversed after solidification of the resin material, (i) the base plate and the mold and (ii) the resin material repel each other. This decreases adhesion between (i) the base plate and the mold and (ii) the resin material. As a result, the mold can be released without putting a load on the resin material.

A resin molding apparatus of the embodiment of the present invention includes: a first mold having a first transfer surface for transferring a predetermined shape to a dielectric resin material; a second mold having a second transfer surface for transferring a predetermined shape to the dielectric resin material, the second transfer surface being opposed to the first transfer surface; moving means that shifts a relative position of the first mold and the second mold; curing means that cures the dielectric resin material so as to form a resin molded product while the second transfer surface is being pressed against the dielectric resin material, the dielectric resin material having been supplied on the first transfer surface; and electric field forming means that forms an electric field by application of alternate-current voltage between the first mold and the second mold.

According to the above arrangement, in a state where the second transfer surface of the second mold is pressed against a resin material supplied on the first transfer surface of the first mold, the curing means cures the resin material so that a resin molded product is formed. In this arrangement, when the moving means separates the second transfer surface from the resin molded product, the electric field forming means applies alternative-current voltage between the first mold and the second mold. Thereby, polarities of the first and second molds are constantly reversed. Following the reversal of the polarities of the first and second molds, dipoles on the surface of the resin material move. This movement of the dipoles decreases adhesion between the resin material and the first and second molds. As a result, the mold can be easily released.

A resin molding apparatus of the embodiment of the present invention includes: a base plate; a mold having a transfer surface for transferring a predetermined shape to a dielectric resin material; moving means that shifts a relative position of the mold and the base plate; curing means that cures the dielectric resin material so as to form a resin molded product while the transfer surface is being pressed against the dielectric resin material, the dielectric resin material having been supplied on the base plate; and electric field forming means that forms an electric field by application of alternate-current voltage between the mold and the base plate.

According to the above arrangement, in a state where the transfer surface of the mold is pressed against a resin material supplied on the base plate, the curing means cures the resin material so that a resin molded product is formed. In this arrangement, when the moving means separates the transfer surface from the resin molded product, the electric field forming means applies alternative-current voltage between the base plate and the mold. Thereby, polarities of the base plate and the mold are constantly reversed. Following the reversal of the polarities of the base plate and the mold, dipoles on the surface of the resin material move. This movement of the dipoles decreases adhesion between (i) the base plate and the mold and (ii) the resin material. As a result, the mold can be easily released.

A resin molding method of the embodiment of the present invention includes the steps of: (a) curing a dielectric resin material so as to form a resin molded product while a transfer surface of a mold is being pressed against the dielectric resin material, the dielectric resin material having been supplied on a base plate; and (b) separating the transfer surface from the resin molded product, the step (a) including the sub-step of forming an electric field in a predetermined direction by application of direct-current voltage between the base plate and the mold, the step (b) including the sub-step of forming an electric field in a direction that is opposite to the predetermined direction between the base plate and the mold.

According to the above arrangement, in the step (a) of curing a resin material, in a state where the transfer surface of the mold is pressed against the resin material supplied on the base plate, the resin material is cured. In the step (b) of releasing a mold, the transfer surface is separate from the resin molded product and thereby, a resin molded product is formed. In this arrangement, in the step (a) of curing the resin material, an electric field in a predetermined direction is formed between the base plate and the mold. Then, in the step (b) of releasing the mold, an electric field whose direction is opposite to the predetermined direction of the electric field is formed.

When the resin material is solidified, a charged state of the resin material is fixed. Therefore, when the direction of the electric field is reversed after solidification of the resin material, (i) the base plate and the mold and (ii) the resin material repel each other. This decreases adhesion between (i) the base plate and the mold and (ii) the resin material. As a result, the mold can be released without putting a load on the resin material.

A resin molding method of the embodiment of the present invention includes the steps of: (a) curing a dielectric resin material so as to form a resin molded product while a second transfer surface of a second mold is being pressed against the dielectric resin material, the dielectric resin material having been supplied on a first transfer surface of a first mold; and (b) separating the second transfer surface from the resin molded product, the step (b) including the sub-step of applying alternate-current voltage between the first mold and the second mold.

According to the above arrangement, in the step (a) of curing a resin material, in a state where the second transfer surface of the second mold is pressed against the resin material supplied on the first transfer surface of the first mold, the resin material is cured. Further, in the step (b) of releasing a mold, the second transfer surface is separated from a resin molded product. In this way, the resin molded product is molded. In this arrangement, in the step (b) of releasing the mold, by application of alternative-current voltage between the first mold and the second mold, polarities of the first and second molds are constantly reversed. Following the reversal of the polarities of the first and second molds, dipoles on the surface of the resin material move. This movement of the dipoles decreases adhesion between the resin material and the first and second molds. As a result, the mold can be easily released.

A resin molding method of the embodiment of the present invention includes the steps of: (a) curing a dielectric resin material so as to form a resin molded product while a transfer surface of a mold is being pressed against the dielectric resin material, the dielectric resin material having been supplied on a base plate; and (b) separating the transfer surface from the resin molded product, the step (b) including the sub-step of applying alternate-current voltage between the base plate and the mold.

According to the above arrangement, in the step (a) of curing a resin material, in a state where the transfer surface of the mold is pressed against the resin material supplied on the base plate, the resin material is cured. Further, in the step (b) of releasing a mold, the transfer surface is separated from a resin molded product. In this way, the resin molded product is molded. In this arrangement, in the step (b) of releasing the mold, by application of alternative-current voltage between the base plate and the mold, polarities of the base plate and the mold are constantly reversed. Following the reversal of the polarities of the base plate and the mold, dipoles on the surface of the resin material move. This movement of the dipoles decreases adhesion between (i) the base plate and the mold and (ii) the resin material. As a result, the mold can be easily released.

In the resin molding apparatus and resin molding method of the embodiment of the present invention, preferably, the resin molded product is one or more lenses.

As described above, according to the present invention, mold release can be performed without putting a load on the resin material. Therefore, the present invention is particularly suitable for molding a lens having a complex shape.

INDUSTRIAL APPLICABILITY

The present invention is applicable not only to a lens molding apparatus but also to an apparatus for molding any resin molded product other than lenses.

REFERENCE SIGNS LIST

1 mold (first mold)
1*a* transfer surface (first transfer surface)
2 mold (mold, second mold)
2*a* transfer surface (transfer surface, second transfer surface)
3 heating device (curing means)
4 DC power source (electric field forming means)
5*a* switch (switching means)
5*b* switch (switching means)
5*c* switch (switching means)
5*d* switch (switching means)
5*e* switch
6 support device (moving means)
7 dispenser
8 dielectric resin (resin material)
9 base plate
11 mold (first mold)
12 mold (second mold)
14 AC power source (electric field forming means)
18 lens (resin molded product)
100 lens molding apparatus (resin molding apparatus)
200 lens molding apparatus (resin molding apparatus)
300 lens molding apparatus (resin molding apparatus)

The invention claimed is:

1. A resin molding method comprising the steps of:
   (a) curing a dielectric resin material so as to form a resin molded product while a second transfer surface of a second mold is being pressed against the dielectric resin material, the dielectric resin material having been supplied on a first transfer surface of a first mold; and
   (b) separating the second transfer surface from the resin molded product,
   the step (a) including the sub-step of forming an electric field in a predetermined direction by application of direct-current voltage between the first mold and the second mold,
   the step (b) including the sub-step of forming an electric field in a direction that is opposite to the predetermined direction between the first mold and the second mold.

2. A resin molding method comprising the steps of:
   (a) curing a dielectric resin material so as to form a resin molded product while a transfer surface of a mold is being pressed against the dielectric resin material, the dielectric resin material having been supplied on a base plate; and
   (b) separating the transfer surface from the resin molded product,
   the step (a) including the sub-step of forming an electric field in a predetermined direction by application of direct-current voltage between the base plate and the mold,
   the step (b) including the sub-step of forming an electric field in a direction that is opposite to the predetermined direction between the base plate and the mold.

3. The resin molding method as set forth in claim 1, wherein the resin molded product is one or more lenses.

* * * * *